Figure 1:
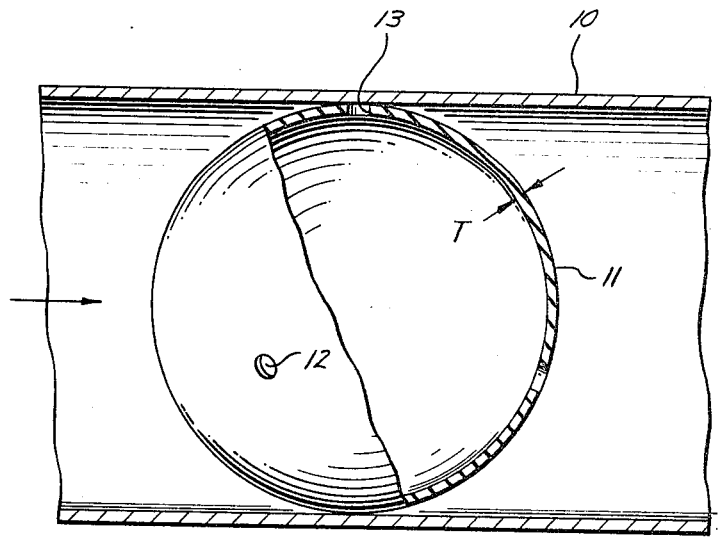

Oct. 4, 1966     B. VER NOOY     3,276,061

PIPELINE APPARATUS

Filed May 5, 1965

Burton Ver Nooy
INVENTOR.

BY Browning, Simmons
Hyer & Eickenroht
ATTORNEYS

United States Patent Office 3,276,061
Patented Oct. 4, 1966

3,276,061
PIPELINE APPARATUS
Burton Ver Nooy, Broken Arrow, Okla., assignor to
T. D. Williamson, Inc., Tulsa, Okla.
Filed May 5, 1965, Ser. No. 453,400
4 Claims. (Cl. 15—104.06)

This invention relates to pipeline apparatus including a hollow sphere or ball which is passed through the line for various purposes such as product separation, liquid removal from gas lines, etc.

Spheres or balls have been passed through pipelines for the purpose of product separation, calibration of meter loops, water removal, product removal and other uses where an intermediate seal is required to transmit pressure. These spheres have been constructed with very thick walls of rubber. In use, the inside of the sphere is filled with water which is pumped in under sufficient pressure to expand the sphere to the desired size, i.e., so that the sphere contacts the pipe wall around the entire inner circumference of the pipe. The purpose of the water is to not only permit sizing of the spheres but also to prevent them from collapsing when inserted into the pipeline under pressure. However, this type of sphere construction has several disadvantages. For example, the spheres are made with very thick walls and hence are quite heavy and difficult to handle. For example, a 30 inch diameter sphere has walls of about 4½ inches in thickness and weighs about 800 pounds without any water inside it. Also, considerable care must be taken that the injected water displaces all of the air from inside the sphere in order to prevent partial collapse of the sphere. Further, temperature changes occurring as the sphere moves through the pipeline causes expansion and contraction thereby changing the degree of contact of the sphere with the wall of the pipeline. In the larger size spheres, temperature differences can change the nominal diameter of spheres as much as ½ inch. Also, the injected water adds weight to the already overly-heavy sphere and hence increases its inertia and its difficulty of handling.

It is an object of this invention to provide a pipeline apparatus including a hollow sphere which is light in weight, relatively thin walled, and which does not require inflation with a liquid and yet will not collapse under pipeline pressure.

Another object is to provide such an apparatus wherein the pressure inside of the sphere is always equalized with the pipeline pressure regardless of fluctuations in and the magnitude of the latter.

Another object of the invention is to provide a pipeline apparatus which can be used to conduct gas and including a sphere which can be made somewhat smaller in diameter than that of the pipeline and yet satisfactorily remove liquid from the pipeline.

Figure 2:
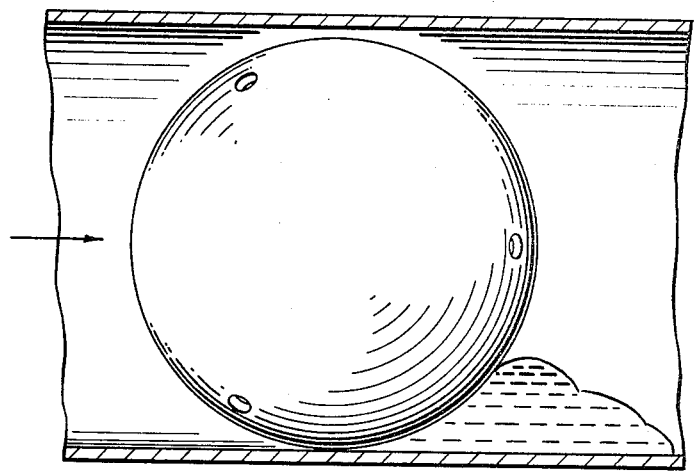

Other objects, advantages and features of the invention will be apparent to one skilled in the art upon consideration of the specification, claims and the attached drawings wherein:

FIG. 1 illustrates a preferred embodiment of the invention showing a pipeline in vertical section and a sphere therein which is partially in section; and FIG. 2 is a drawing similar to FIG. 1 except showing how a sphere moves liquid through a gas line.

Referring to FIG. 1, a pipeline 10 is shown in vertical cross section. Disposed in the pipeline is a sphere 11 which is freely movable through the pipeline by the fluid flowing through the line. As shown, the sphere has a smooth exterior surface and is hollow with walls of a thickness T, which will be discussed in greater detail below. The wall of the sphere has at least one opening 12 through it so that the pressure inside the sphere can equalize with that in the pipeline. It will be appreciated that conventional pipelines operate under high pressures, frequently of the order of 800 to 1,000 p.s.i. The opening 12 permits the pressure inside the sphere to equal that in the pipeline thereby preventing the pipeline pressure from collapsing or expanding the sphere. Also, it will be appreciated that the pressure inside the pipeline will vary along its length. For example, in a products line, pressure will vary with elevation so that, for example, a pipeline running over a hill into a valley will have a lower pressure on top of the hill and a higher pressure down in the valley. The opening 12 permits equalization of pressures despite these fluctuations of pipeline pressure along the pipeline.

While one opening 12 will normally be sufficient, additional ones can be used to assure that one will always be open to the pipeline should the sphere stop in the line. For example, if opening 13 were the only one in the sphere and the latter entered a trap and stopped in the position shown in FIG. 1, the wall of the pipeline would bridge across opening 13 so that when the trap pressure was reduced, the pressure inside the sphere would tend to cause it to burst. Preferably a number of openings are used such that at least one of them will be out of contact with the pipe wall regardless of the position of the sphere in the pipe. Stated in another way, at least one opening will always lie to one side of a diametral plane drawn through the other openings. As illustrated in the drawings, four openings are disposed at an equiangular relationship to each other.

The sphere is preferably made from a relatively rigid material having the wear and abrasion resistance characteristics of polyurethane. Polyurethane itself has been found to be an exceptionally good material in that it is quite resistant to abrasion and wear. It should preferably have a hardness of 60 to 95 durometer (on the Shore A Scale) with a specific value selected from that range depending upon the thickness of the wall. That is, thicker walled spheres can have a durometer within a lower portion of the range and those with thinner walls from the upper portion. When the sphere is to be used in liquid lines, the durometer should preferably be from the range of 60 to 85 and for gas line use, the durometer should be from 70 to 95.

The outside diameter of the sphere, in an unstressed condition, should be within the range of 0.93 to 1.03 of the actual inside diameter of the pipe. When the sphere is used in liquid lines, it should preferably form a seal with the entire inner circumference of the pipe and therefore its diameter should be within the range of 1.00 to 1.03 of the actual inside pipe diameter. However, it has been found that when the sphere is being used in gas lines to remove liquid therefrom, it is preferable to make the sphere somewhat smaller than the pipe in order to reduce friction and wear. It has been found that a sphere having an outside diameter within the range of 0.93 to 0.99 of the inside pipe diameter is preferred. Thus as the sphere is moved through the pipeline and pushes liquid ahead of it as shown in FIG. 2, a pressure differential must exist between the upstream and downstream sides of the sphere in order to move the sphere along the pipeline. As a result of this, some gas bypasses the sphere through its clearance with the pipeline. The liquid ahead of the sphere is prevented from leaking back upstream of the sphere through the clearance by virtue of the gas flow which blows it back ahead of the sphere. By keeping the sphere diameter at least 93% of that of the pipe, the gas velocity past the sphere is sufficiently high to keep the liquid ahead of it.

With the foregoing construction of the sphere, it has been found possible to maintain the wall thickness substantially uniform and within the range of 0.02 to 0.10 of the outside diameter of the sphere. This permits the sphere to be relatively light in weight and to use a minimum of materials of construction. In most cases, a wall thickness of 0.03 to 0.04 of the sphere's outside diameter will be found satisfactory except for spheres of smaller size such as 2 inch, which should have a thickness chosen from the upper part of the range, e.g., 0.09 of its diameter. In contrast to the water inflated spheres mentioned above of which a 30 inch has a 4½ inch thick wall, the sphere of this invention in a 30 inch size can be satisfactorily made with a 1.25 inch wall.

The operation of the invention is adequately described above and will not need to be separately described at this point.

From the foregoing, it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. A pipeline apparatus, comprising, in combination, a pipe adapted to conduct fluids from one point to another, and a freely movable hollow sphere within said pipe and having a smooth exterior surface and being made of a material having the wear and abrasion resistance characteristics of polyurethane, said sphere having at least one hole through the wall thereof which is open to equalize the pressure interior of the sphere with that exterior thereof, said wall of the sphere having a substantially uniform thickness within the range of 0.02 to 0.10 the outside diameter of the sphere, said sphere having an outside diameter within the range of 0.93 to 1.03 of the actual inside diameter of said pipe.

2. The apparatus of claim 1 wherein said sphere has a plurality of holes through the wall thereof spaced so that at least one hole is out of contact with the pipe wall at all times.

3. The apparatus of claim 2 wherein said sphere has a plurality of holes through the wall thereof spaced so that at least one hole is out of contact with the pipe wall at all times.

4. A pipeline apparatus, comprising, in combination, a pipe adapted to conduct gas from one point to another, and a freely movable hollow sphere within said pipe and having a smooth exterior surface and being made of a material having the wear and abrasion resistance characteristics of polyurethane, said sphere having at least one hole through the wall thereof which is open to equalize the pressure inside the sphere with that outside it, said sphere having an outside diameter within the range of 0.93 to 0.99 of the actual inside diameter of said pipe.

References Cited by the Examiner

UNITED STATES PATENTS

| 2,668,307 | 2/1954 | Preen | 15—104.06 |
| 2,794,197 | 6/1957 | Crane | 15—104.06 |
| 3,011,197 | 12/1961 | Nehse et al. | 15—104.06 |

CHARLES A. WILLMUTH, *Primary Examiner.*

E. L. ROBERTS, *Assistant Examiner.*